United States Patent [19]

Tobey et al.

[11] Patent Number: 4,532,674
[45] Date of Patent: Aug. 6, 1985

[54] HINGE ASSEMBLY WITH OVER-CENTER LATCH

[75] Inventors: William H. Tobey, Littleton; Donald A. Thomas, Englewood; William J. Gardner, Littleton, all of Colo.

[73] Assignee: Martin Marietta Corporation, Bethesda, Md.

[21] Appl. No.: 373,579

[22] Filed: Apr. 30, 1982

[51] Int. Cl.³ .............................................. E05F 1/08
[52] U.S. Cl. ..................................... 16/295; 16/308; 16/323; 16/375; 16/387
[58] Field of Search ................ 16/231, 232, 278, 279, 16/294, 295, 297, 304, 308, 321, 323, 324, 347, 349, 374, 375, 385, 387

[56] References Cited

U.S. PATENT DOCUMENTS

| | | | |
|---|---|---|---|
| 66,927 | 7/1867 | Wiswall | 16/295 |
| 629,185 | 7/1899 | Arnold | 16/387 X |
| 834,635 | 10/1906 | Olson | 16/297 |
| 1,228,473 | 6/1917 | Panay | 16/297 X |
| 1,627,329 | 5/1927 | Hill | 16/278 X |
| 2,674,761 | 4/1954 | Weiss | 16/374 X |
| 2,838,785 | 6/1958 | Kapanka | 16/323 |
| 3,187,373 | 6/1965 | Fisher | 16/324 |
| 3,295,699 | 1/1967 | Bauernschub, Jr. | 214/1 |
| 3,576,566 | 4/1971 | Cover, Jr. et al. | 343/705 |
| 3,655,297 | 4/1972 | Bolen, Jr. et al. | 416/72 |
| 4,030,102 | 6/1977 | Kaplan et al. | 343/915 |
| 4,157,599 | 6/1979 | Holmes | 16/321 X |
| 4,243,105 | 1/1981 | Vogel et al. | 16/223 |

FOREIGN PATENT DOCUMENTS

| | | | |
|---|---|---|---|
| 2405604 | 8/1975 | Fed. Rep. of Germany | 16/294 |
| 2756319 | 6/1979 | Fed. Rep. of Germany | 16/323 |
| 2080409 | 2/1982 | United Kingdom | 16/304 |

*Primary Examiner*—Fred Andrew Silverberg
*Attorney, Agent, or Firm*—Patrick M. Hogan; Phillip L. DeArment; Gay Chin

[57] ABSTRACT

A hinge assembly which includes two sleeves, two U-channels, a spring to effect pivotal movement between the sleeves and several links which both transmit drive force from the spring and act as an overcenter latch to lock the hinge assembly in an unfolded configuration. Each U-channel is disposed within one of the sleeves and is pivotally connected to the other U-channel to provide the pivotal connection between the sleeves. The spring and links are contained within the interior of the hinge assembly to provide a smooth, snag resistant exterior.

2 Claims, 10 Drawing Figures

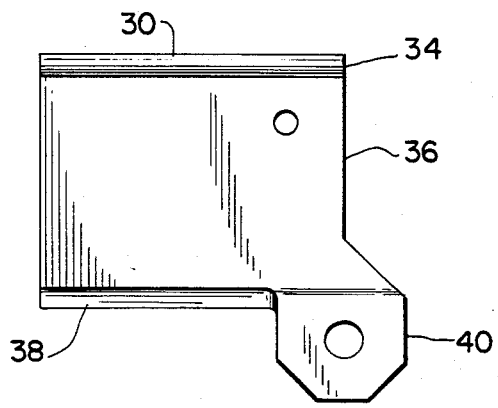
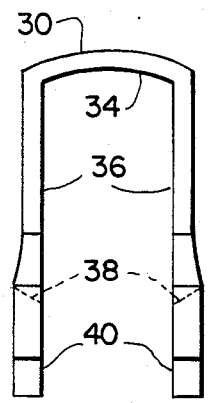
FIG. 3
FIG. 4
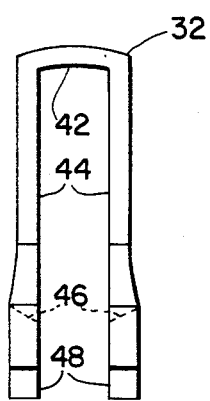
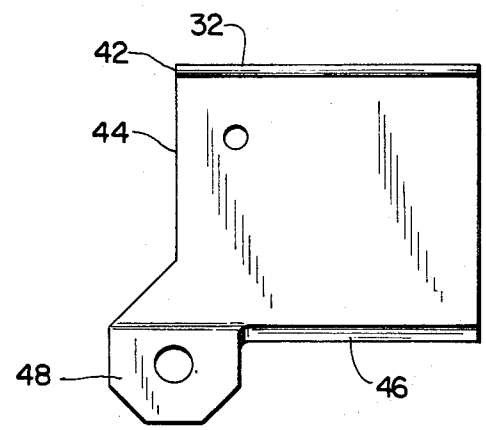
FIG. 5
FIG. 6
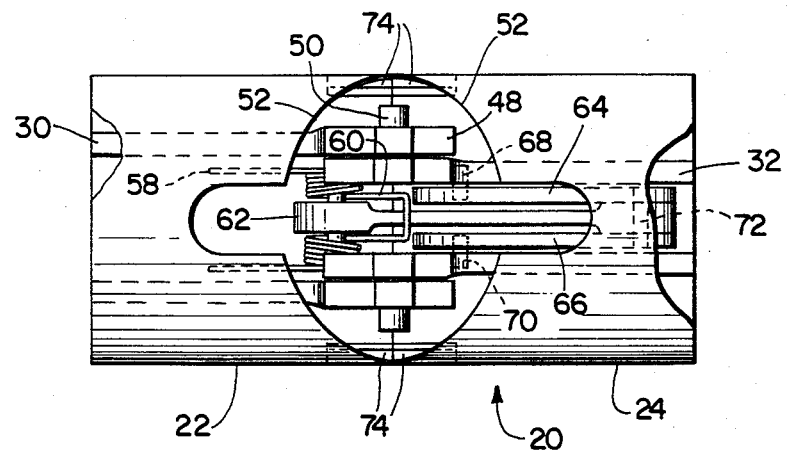
FIG. 7

HINGE ASSEMBLY WITH OVER-CENTER LATCH

BACKGROUND OF THE INVENTION

1. Field of the Invention

This invention relates to hinges and particularly to a new and improved hinge assembly having relatively few parts and which is compact, easily fabricated and includes overcenter latching capability.

2. Description of the Prior Art

Hinges are commonly employed to provide relative movement between two members of a structure. In particular applications, the weight, cost, compactness and reliability of the hinge becomes particularly important. For example, large structures for use in outer space are folded as compactly as possible in order to fit into a space launch vehicle. Once the vehicle is in space, the structure is removed from the vehicle and unfolded, or deployed. Such large space structures can include many hinges, some or all of which may be required to automatically unfold the members attached to them during the deployment sequence. Additionally, the hinges may have to lock in the unfolded position. Thus, the hinges must have a high degree of reliability.

Although hinges have been previously designed to accomplish the above tasks, such prior art hinges often require a relatively high number of parts, many of which are complex and bulky. The higher number of parts tends to reduce reliability and increase cost. In addition, the heavier weight of the hinges makes them less desirable for space launches by reduction of the effective vehicle payload.

Another disadvantage of many prior art hinges is that they are made of metal. In the temperature extremes of a space environment, such metallic hinges may experience thermal distortion which could reduce the ability of the hinges to properly operate.

An additional disadvantage of many prior art hinges is that they employ external parts or linkages in their drive systems. These external parts or linkages can easily snag wires, cables or antenna reflector surfaces that are mounted on or near and deploy with hinged structural members.

In view of the above-mentioned problems, it is therefore an object of the present invention to provide a hinge assembly which can be easily and comparatively inexpensively fabricated.

Another object of the present invention is to provide a hinge assembly which is light and which has a high degree of reliability through the use of relatively few parts.

Still another object of the present invention is to provide a hinge assembly which is thermally stable.

Yet another object of the present invention is to provide a hinge assembly having a relatively smooth, snag resistant exterior by disposing the drive and latch mechanisms within the interior of the hinge asembly.

SUMMARY OF THE INVENTION

The present invention, in accordance with one embodiment thereof, comprises a hinge assembly which includes first and second sleeves and first and second U-channels fixedly disposed within the sleeves. The U-channels are pivotally connected for providing relative pivotal movement between the first and second sleeves.

In a particular embodiment of the invention, the hinge assembly includes resilient means for urging the second sleeve to pivot toward a preselected position relative to the first sleeve. A plurality of links can also be included to both transmit a drive force from the resilient means and act as an overcenter latch to lock the hinge assembly in a particular configuration. The hinge assembly is preferably made primarily of graphite impregnated with an epoxy resin.

BRIEF DESCRIPTION OF THE DRAWING

This invention will be better understood from the following description taken in conjunction with the accompanying drawing, wherein:

FIGS. 3 and 4 are side and front views, respectively, of the first U-channel.

FIGS. 5 and 6 are front and side views, respectively, of the second U-channel.

FIG. 7 is a bottom view of the hinge assembly.

DESCRIPTION OF THE PREFERRED EMBODIMENT

Figure 1:
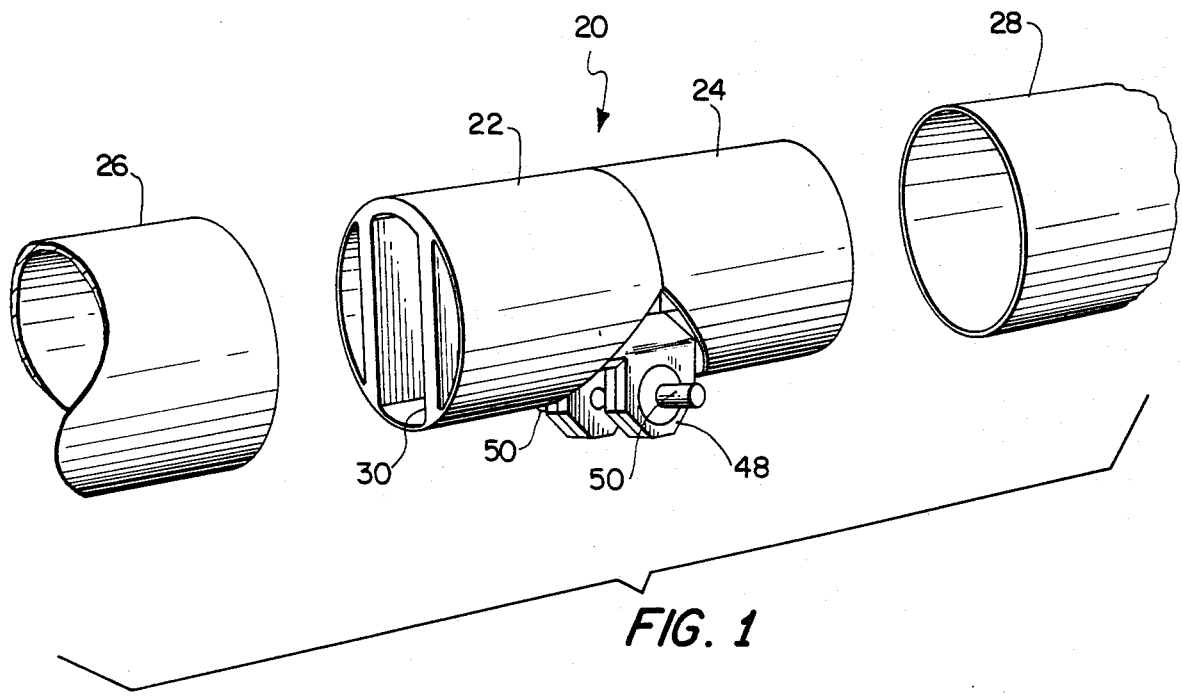
FIG. 1 is a perspective view of the hinge assembly of the present invention shown in an unfolded configuration.

Turning now to a consideration of the drawing and in particular to FIG. 1, there is shown the hinge assembly 20 of the present invention in an unfolded configuration. The hinge assembly 20 comprises a first sleeve 22 and a second sleeve 24 that are shaped and sized to be attachable to members 26 and 28 to thereby provide hinging motion between the members. The sleeves could, for example, fit into the ends of the members 26 and 28 and be bonded thereto. Such a sleeve arrangement not only simplifies fabrication of the hinge assembly since the first and second sleeves 22 and 24 are relatively short and easy to work with, but it also allows a standard hinge assembly to be mass produced which can then be attached to members 26 and 28 which are of any required length. Of course, if desired, the ends of the members 26 and 28 could themselves comprise the sleeves of the hinge assembly.

The first and second sleeves 22 and 24 can have any desired shape, preferably having a shape compatible with the members 26 and 28 to which they are attached. One suitable shape is the generally cylindrical shape shown in FIG. 1. Such cylindrically shaped sleeves lend themselves to simple fabrication by being cut from sections of tubular stock.

Figure 2:
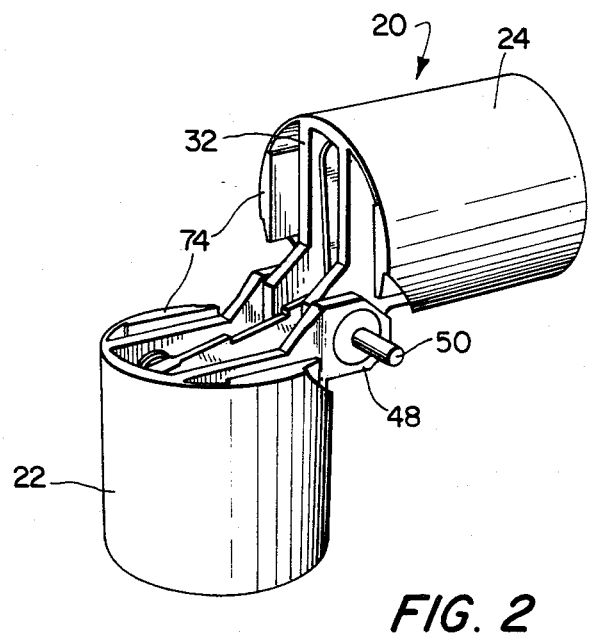
FIG. 2 is a perspective view of the hinge assembly in a partially folded configuration.

The hinge assembly 20 also comprises a first U-channel 30 fixedly disposed, as by bonding, within the first sleeve 22 and a second U-channel 32, shown in FIG. 2, fixedly disposed within the second sleeve 24. FIG. 2 shows the hinge assembly 20 in a partially folded configuration with the first and second sleeves 22 and 24 at approximately a 90° angle.

The first U-channel 30 can best be seen in FIGS. 3 and 4 and comprises a base portion 34 and two substantially straight leg portions 36 extending from the base portion. The base portion 34 and lower edges 38 of the leg portions 36 preferably are shaped to correspond to the shape of the interior of the first sleeve 22 in which the U-channel is disposed. Thus, the base portion 34 and the lower edges 38 are curved when the first sleeve is cylindrical in shape. The first U-channel 30 also includes two tabs 40 extending from the end of the U-channel in a direction away from the base portion 30.

Turning now to FIGS. 5 and 6, the second U-channel 32 can be seen to also comprise a base portion 42 and two substantially straight leg portions 44 extending from the base portion. The base portion 42 and the lower edges 46 of the leg portions 44 correspond in shape to the shape of the interior of the second sleeve 24 in which the second U-channel is disposed. In this case, the base portion 42 and the lower edges 46 are curved to match the generally cylindrical shape of the second sleeve 24. The second U-channel 32 further includes two tabs 48 extending from the end of the U-channel in a direction away from the base portion 42.

Comparing FIGS. 4 and 5, it can be seen that the distance between each of the tabs 40 of the first U-channel 30 is greater than the distance between each of the tabs 48 of the second U-channel 32, to enable the tabs 48 of the second U-channel to be received between the tabs 40 of the first U-channel.

The first and second U-channels 30 and 32 can be simply machined from sections cut from lengths of two sizes of U-channel stock, thus adding to the overall ease of fabrication of the hinge assembly 20.

The first and second U-channels 30 and 32 are pivotally connected, preferably at the tabs 48 such as with pins 50 shown in FIGS. 1 and 2, for providing relative pivotal movement between the first and second sleeves 22 and 24 in which the U-channels are disposed.

As can best be seen in FIG. 7 which is a bottom view of the hinge assembly 20, the first and second sleeves 22 and 24 include cutouts 52 near the adjacent ends thereof. The cutouts 52 are shaped such that the tabs 48 extend through the cutouts to enable the first and second sleeves to pivot relative to each other without interference about the pins 50 approximately 180° between the folded configuration shown in FIG. 8 and the unfolded configuration shown in FIGS. 1, 7, 9 and 10. In the folded configuration of FIG. 8, the second sleeve 24 has been pivoted relative to the first sleeve 22 such that the sides of the first and second sleeves are closely adjacent.

Figure 9:
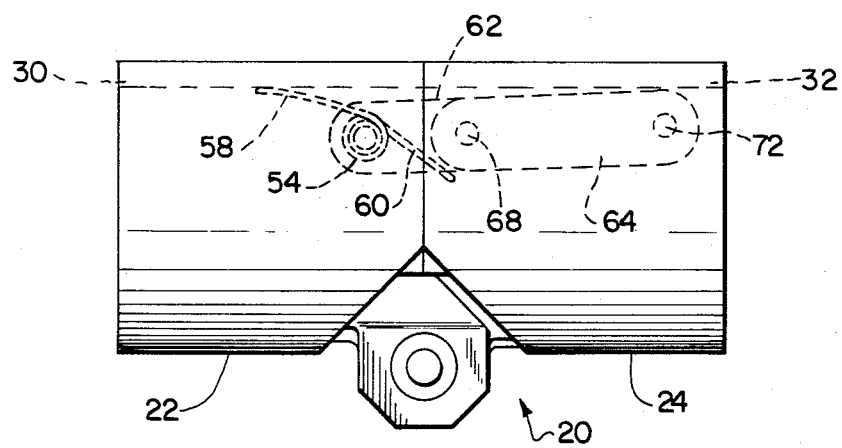
FIG. 9 is a side view of the hinge assembly in an unfolded configuration.
Figure 10:
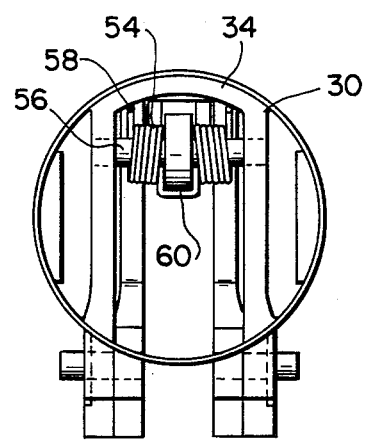
FIG. 10 is an end view of the hinge assembly.

The hinge assembly 20 preferably comprises resilient means, such as the torsion spring 54 shown in FIG. 10, for urging the second sleeve 22 to pivot toward a preselected position relative to the first sleeve 22. When the hinge assembly 20 is employed in a structure to automatically deploy the structure from a folded to an unfolded configuration, it is preferable that the resilient means, or spring 54, be biased to urge the second sleeve to pivot from the folded configuration of FIG. 8 to the unfolded configuration of FIG. 9. To accomplish this, the spring 54 is mounted on the first U-channel 30, as can be seen in FIG. 10, with a pin 56 and includes one or a pair of legs 58 which abut against the base portion 34 of the first U-channel the first U-channel 30 being configured to provide enough distance between the leg portions 36 thereof to allow the spring 54 to have a plurality of windings extending between the leg portions sufficient to provide the spring force necessary to deploy the structure. The spring 54 also includes an arm 60 which is positioned, in a manner to be more fully explained hereinafter, for imparting spring force against the second U-channel 32 to thereby pivot the second sleeve 24 relative to the first sleeve 22.

As can be seen in FIG. 7, the hinge assembly 20 preferably also includes an overcenter latch for locking the hinge assembly in the unfolded configuration whereby the ends of the first and second sleeves 22 and 24 abut. One example of a suitable overcenter latch comprises a primary link 62 and two secondary links 64 and 66, each of the links having flat sides, a small thickness and an elongated length such that when the first and second sleeves 22 and 24 are in the unfolded configuration, all three links will fit side-by-side between the leg portions 44 (identified in FIG. 5) of the second U-channel 32 so as to permit the overcenter latch to be compact and operate within the interior of the hinge assembly 20. The secondary links 64 and 66 are disposed slightly apart and parallel to each other and each has one end pivotally connected to the second U-channel 32 with pins 68 and 70, respectively. The other ends of the secondary links 64 and 66 are pivotally connected to an end of the primary link 62 with a pin 72, the end of the primary link being disposed between the ends of the secondary links. The other end of the primary link 62 is pivotally connected to the first U-channel 30 with the pin 56, the same pin on which the spring 54 is mounted.

The primary link 62 and the secondary links 64 and 66 are sized and arranged such that when the first and second sleeves 22 and 24 are in the unfolded configuration, shown in FIG. 9, the primary link 62 is positioned relative to the secondary links 64 and 66 at a sufficient angle to prevent relative movement between the first and second sleeves, thus acting as an overcenter latch. The arm 60 of the spring 54 is positioned against the primary link 62, as can be seen in FIG. 7, to urge the primary link into the overcenter latch position, thus locking the hinge assembly 20 in the unfolded configuration. Returning to FIG. 9, to unlock the overcenter latch, the ends of the primary and secondary links 62, 64 and 66 at the pin 72 are moved in a downward direction, against the force of the spring 54, until the first and second sleeves 22 and 24 can pivot apart.

Figure 8:
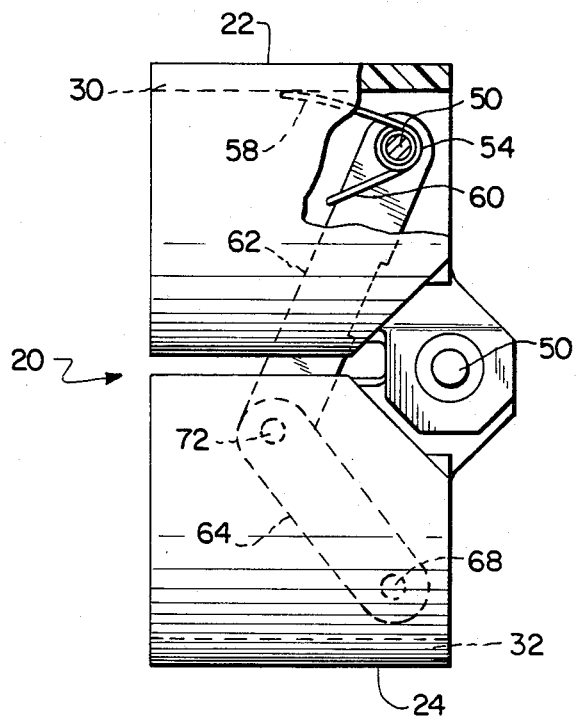
FIG. 8 is a side view of the hinge assembly in a folded configuration.

As was described earlier, the spring 54 urges the second sleeve 24 to pivot relative to the first sleeve 22. Referring to FIGS. 8 and 9, this is accomplished through the pivotal connections among the primary link 62, the two secondary links 64 and 66 and the second U-channel 32, shown in dashed lines. In FIG. 8, the hinge assembly 20 is in a folded configuration. The arm 60 of the spring 54 is positioned against the primary link 62 and urges the primary link to pivot about the pin 50 in a counter clockwise direction. The cutouts 52 in the lower sections of the first and second sleeves 22 and 24 are sized to allow the primary and secondary links to extend through them as necessary. As the primary link 62 pivots, it causes the secondary links 64 and 66 to exert a force upon the second U-channel 32 and second sleeve 24 at the pins 68 and 70. This force creates a moment about the pins 50 thereby effecting counterclockwise pivotal movement of the second sleeve 24 about the pins 50 toward the unfolded configuration shown in FIG. 9.

Thus, the spring 54 serves a dual purpose, to urge the second sleeve 24 to pivot relative to the first sleeve 22 toward the unfolded configuration and to urge the primary link 62 of the overcenter latch into a position to lock the hinge assembly 20 in the unfolded configuration. Correspondingly, the primary and secondary links 62, 64 and 66 not only act as an overcenter latch but also act as a drive mechanism to help transmit the spring forces to the second sleeve to effect pivotal movement thereof. The hinge assembly 20 of the present invention therefore requires fewer parts and is thus lighter, simpler, less expensive and presents a more compact profile then many current hinge assemblies. The fewer required parts also improves the reliability of the hinge assembly. In addition, because the spring 54 and the primary and secondary links 62, 64 and 66 are contained within the interior of the hinge assembly 20, the exterior of the hinge assembly is relatively smooth and snag resistant. Thus, the chance of the hinge assembly snagging or interfering with wires, cables or antenna reflector surfaces which are mounted near the hinge assembly is greatly reduced.

To help withstand compression loads when the ends of the first and second sleeves 22 and 24 abut against each other, the hinge assembly 20 can include bumpers 74, best seen in FIG. 7. The bumpers 74 are made of an appropriate material, such as graphite fibers imbedded in epoxy, and are attached in opposing pairs on the inner surfaces at abutting ends of the first and second sleeves 22 and 24 in the spaces defined between the leg portions 36 and 44 (identified in FIGS. 4 and 5) of the first and second U-channels 30 and 32 and the first and second sleeves 22 and 24, respectively. The bumpers 74 can protrude slightly beyond the ends of the first and second sleeves such that the bumpers will contact each other before the ends of the first and second sleeves come into contact.

The above described hinge assembly 20 can be made of any appropriate material. One particularly suitable material of which the first and second sleeves 22 and 24, the first and second U-channels 30 and 32 and the primary and secondary links 62, 64 and 66 can be made is graphite impregnated with an epoxy resin. The graphite/epoxy has better thermal stability and is lighter than traditional metal hinge assemblies. The better thermal stability of graphite/epoxy is particularly important when the hinge assembly is to be employed in an outer space application where thermal extremes are encountered.

It is to be understood that this invention is not limited to the particular embodiments disclosed and it is intended to cover all modifications coming within the true spirit and scope of this invention as claimed.

What is claimed is:

1. A hinge assembly comprising:

(a) first and second generally cylindrically-shaped sleeves including cutouts near adjacent ends thereof;

(b) first and second U-channels fixedly disposed within said first and said second sleeves, respectively, each U-channel comprising a curved base portion, two substantially straight leg portions, and a tab extending from each leg portion through the cutout in said first or said second sleeve in which said U-channel is disposed, the tabs of said first and said second U-channels being pivotally connected for thereby enabling relative pivotal movement between said first and said second sleeves;

(c) a primary link and two secondary links, each of said primary and said secondary links having flat sides, a small thickness and an elongated length for fitting side-by-side between said leg portions of said second U-channel when said first and said second sleeves are in an unfolded configuration, said secondary links being disposed parallel to each other each having one end pivotally connected to said second U-channel and the other end pivotally connected to an end of said primary link, the other end of said primary link being pivotally connected to said first U-channel, said primary and said secondary links being sized and arranged for comprising an overcenter latch; and (d) a torsion spring mounted on said first U-channel, having an arm positioned against said primary link and having a plurality of windings extending between said leg portions of said first U-channel sufficient to provide the spring force necessary for, through the pivotal connections among said primary link, said secondary links and said second U-channel, urging said second sleeve to pivot into said unfolded configuration abutting end-to-end with said first sleeve and also urging said primary link into a position together with said secondary links between said leg portions of said second U-channel and at an angle to said secondary links sufficient to lock said sleeves in said unfolded configuration.

2. The hinge assembly of claim 1 wherein said first and said second U-channels are configured for defining spaces between said leg portions thereof and said first and said second sleeves, respectively, and wherein said hinge assembly further comprises bumpers disposed in said spaces attached in opposing pairs to inner surfaces at abutting ends of and protruding slightly beyond said ends of said first and said second sleeves.

* * * * *